(12) United States Patent
Rothman et al.

(10) Patent No.: US 8,549,356 B2
(45) Date of Patent: *Oct. 1, 2013

(54) METHOD AND SYSTEM FOR RECOVERY OF A COMPUTING ENVIRONMENT VIA A HOT KEY SEQUENCE AT PRE-BOOT OR RUNTIME

(75) Inventors: Michael A. Rothman, Puyallup, WA (US); Vincent J. Zimmer, Federal Way, WA (US)

(73) Assignee: Intel Corporation, santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/337,926

(22) Filed: Dec. 27, 2011

(65) Prior Publication Data

US 2012/0096305 A1 Apr. 19, 2012

Related U.S. Application Data

(63) Continuation of application No. 11/966,093, filed on Dec. 28, 2007, now Pat. No. 8,103,908.

(51) Int. Cl.
*G06F 11/00* (2006.01)
*G06F 11/07* (2006.01)

(52) U.S. Cl.
USPC ............... 714/23; 714/15; 714/46; 714/57

(58) Field of Classification Search
USPC .......................... 714/15, 23, 46, 57
See application file for complete search history.

(56) References Cited

U.S. PATENT DOCUMENTS

| | | | |
|---|---|---|---|
| 5,745,669 A * | 4/1998 | Hugard et al. | 714/3 |
| 6,038,632 A * | 3/2000 | Yamazaki et al. | 710/260 |
| 6,356,965 B1 | 3/2002 | Broyles et al. | |
| 6,606,716 B1 * | 8/2003 | Vrhel et al. | 714/32 |
| 6,915,449 B2 * | 7/2005 | Bantz et al. | 714/15 |
| 7,111,203 B2 | 9/2006 | Hu et al. | |
| 7,170,498 B2 | 1/2007 | Huang | |
| 7,178,053 B2 | 2/2007 | Ho | |
| 7,447,819 B2 | 11/2008 | Ando | |
| 7,500,146 B2 | 3/2009 | Asayama et al. | |
| 8,103,908 B2 * | 1/2012 | Rothman et al. | 714/15 |
| 2002/0162052 A1 * | 10/2002 | Lewis | 714/36 |
| 2004/0172578 A1 * | 9/2004 | Chen et al. | 714/15 |
| 2005/0050385 A1 | 3/2005 | Chen | |
| 2007/0255934 A1 * | 11/2007 | Dennis | 713/1 |
| 2008/0195836 A1 | 8/2008 | Muppirala et al. | |
| 2009/0172462 A1 | 7/2009 | Rothman et al. | |

* cited by examiner

*Primary Examiner* — Joseph Schell
(74) *Attorney, Agent, or Firm* — Barnes & Thornburg LLP

(57) ABSTRACT

A method and system for recovery of a computing environment includes monitoring during a pre-boot phase and a runtime phase of a computing device for selection of a hot key sequence by a user and performing a recovery action in response to the selection of the hot key sequence by the user. The recovery action may be any one of a number of predetermined and/or selectable actions such as restoring system defaults, migrating memory, displaying a menu of options, setting various software flags, restarting or rebooting the computing device, and/or the like.

20 Claims, 4 Drawing Sheets

METHOD AND SYSTEM FOR RECOVERY OF A COMPUTING ENVIRONMENT VIA A HOT KEY SEQUENCE AT PRE-BOOT OR RUNTIME

CROSS-REFERENCE TO RELATED U.S. PATENT APPLICATION

This application is a continuation application of U.S. application Ser. No. 11/966,093, entitled "METHOD AND SYSTEM FOR RECOVERY OF A COMPUTING ENVIRONMENT DURING PRE-BOOT AND RUNTIME PHASES," which was filed on Dec. 28, 2007 and is now U.S. Pat. No. 8,103,908.

BACKGROUND

End-user ability to perform self-recovery of a computing device from a system crash, virus, error, or other malfunction is typically limited by the end-user's experience, knowledge, as well as, the configuration of the computing device. For example, in computing devices designed for entry-level or emerging markets, built-in recovery resources/services may be limited or non-existent. Additionally, in some cases such as in emerging markets, support for the computing device may be limited to a support document, thereby forcing the end-user to attempt recovery from an error on his/her own.

BRIEF DESCRIPTION OF THE DRAWINGS

The invention described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

DETAILED DESCRIPTION OF THE DRAWINGS

Figure 1:
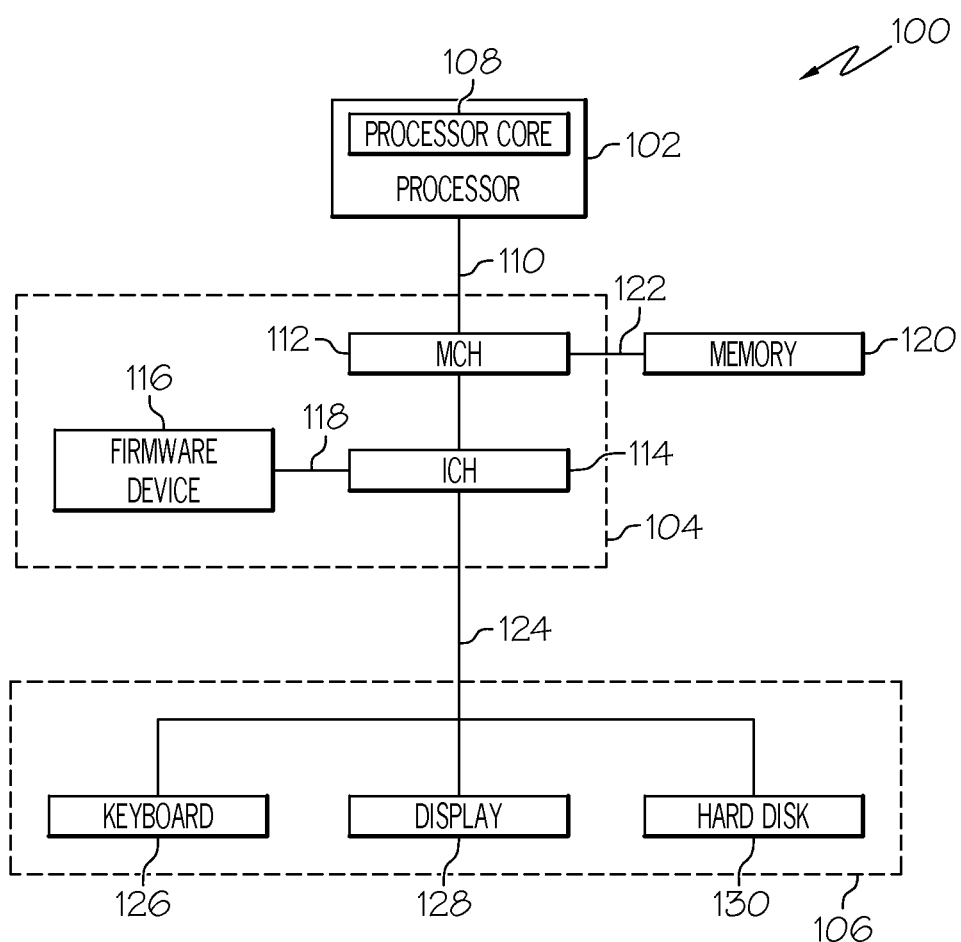
FIG. 1 is a simplified block diagram of a computing device.

While the concepts of the present disclosure are susceptible to various modifications and alternative forms, specific exemplary embodiments thereof have been shown by way of example in the drawings and will herein be described in detail. It should be understood, however, that there is no intent to limit the concepts of the present disclosure to the particular forms disclosed, but on the contrary, the intention is to cover all modifications, equivalents, and alternatives falling within the spirit and scope of the invention as defined by the appended claims.

In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present disclosure. It will be appreciated, however, by one skilled in the art that embodiments of the disclosure may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Embodiments of the invention may be implemented in hardware, firmware, software, or any combination thereof. Embodiments of the invention may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; and others.

Referring now to FIG. 1, in one embodiment, a computing device 100 includes a processor 102, a chipset 104, and a plurality of peripheral devices 106. The computing device 100 may be embodied as any type of computing device such as, for example, a desktop computer system, a laptop computer system, a server or enterprise computer system, or a handheld computing device. In one particular embodiment, the computing device 100 is embodied as a low-cost computer having few features and designed for use in emerging markets. The processor 102 illustratively includes a single processor core 108. However, in other embodiments, the processor 102 may be embodied as a multi-processor having any number of processor cores. Additionally, computing device 100 may include additional processors having one or more processor cores.

The processor 102 is communicatively coupled to the chipset 104 via a number of signal paths 110. The signal paths 110 may be embodied as any type of signal paths capable of facilitating communication between the processor 102 and the chipset 104. For example, the signal paths 110 may be embodied as any number of wires, printed circuit board traces, via, bus, intervening devices, and/or the like. The chipset 104 includes a memory controller hub (MCH) or northbridge 112, an input/output controller hub (ICH) or southbridge 114, and a firmware device 116. The firmware device 116 is communicatively coupled to the input/output controller hub 114 via a number of signal paths 118. Similar to the signal paths 110, the signal paths 118 may be embodied as any type of signal paths capable of facilitating communication between the input/output controller hub 114 and the firmware device 116 such as, for example, any number of wires, printed circuit board traces, via, bus, intervening devices, and/or the like. The firmware device 116 is illustratively embodied as a memory storage device for storing Basic Input/Output System (BIOS) data and/or instructions and/or other information.

The memory controller hub 112 is communicatively coupled to a memory device 120 via a number of signal paths 122. Again, similar to the signal paths 110, the signal paths 122 may be embodied as any type of signal paths capable of facilitating communication between the memory controller hub 112 and the memory device 120 such as, for example, any number of wires, printed circuit board traces, via, bus, intervening devices, and/or the like. The memory devices 120 may be embodied as dynamic random access memory devices (DRAM), synchronous dynamic random access memory devices (SDRAM), double-data rate dynamic random access memory device (DDR SDRAM), and/or other volatile memory devices. Additionally, although only a single memory device is illustrated in FIG. 1, in other embodiments, the computing device 100 may include additional memory devices.

The chipset 104 is also communicatively coupled to the plurality of peripherals 106 via signal paths 124. Again, similar to the signal paths 110, 118, 122, the signal paths 124 may be embodied as any type of signal paths capable of facilitating communication between the chipset 104 and the peripherals 106 such as, for example, any number of wires, printed circuit board traces, via, bus, intervening devices, and/or the like. The peripherals 106 may include any number of peripheral devices including data storage devices, interfaces, and output devices. For example, as illustrated in FIG. 1, the peripheral devices may include a keyboard 126, a display 128, and a hard disk 130. The keyboard 126 includes a number of keys selectable by a user of the computing device 100 to provide one or more keystroke inputs to the computing device 100. The display 128 is usable to display information to the user during use of the computing device 100. The hard disk 130 is usable for the storage of data including, for example, operating systems, applications, and various data. In other embodiments, the computing device 100 may include additional or other peripheral devices depending upon, for example, the intended use of the computing device. Further, it should be appreciated that the computing device 100 may include other components, sub-components, and devices not illustrated in FIG. 1 for clarity of the description. For example, it should be appreciated that the memory controller hub 112 may include a video controller or interface for controlling the display 128 and the input/output controller hub 114 may include an interrupt controller for generating interrupt events.

In use, a user of the computing device 100 may select a hot key sequence from a number of keys of the keyboard 126 to cause the computing device 100 to recover from an error by performing one of a number of recovery actions. In some embodiments, the hot key sequence is embodied as a single key or keystroke of the keyboard 126 selectable by the user to cause the computing device to perform one or more recovery actions. In other embodiments, the hot key sequence may be embodied as two or more keys or keystrokes of the keyboard 126. In such embodiments, the hot key sequence may be embodied as a specific sequence of keys, which must be selected in a pre-determined order to cause the computing device 100 to perform the recovery action(s). For example, a user may be required to select the "Q" key followed by the "W" key to cause the computing device 100 to perform the recovery action(s). Additionally, the hot key or keys may be embodied as traditional keys, such as the numerical and/or alphabetical keys found on a typical computer keyboard, or may be embodied as a special purpose key designed for use only as a hot key for recovery of the computing device 100.

As discussed above, the computing device 100 performs one or more recovery actions in response to the user's selection of the hot key sequence. The recovery action or actions may be embodied as any action performed by the computing device 100 to recover from an error. For example, in some embodiments, the recovery action may be embodied as or otherwise include rebooting the computer device 100, restoring system defaults such as operating system defaults, restoring or re-creating one or more files, migrating memory, or other recovery actions. In one particular embodiment, the recovery action is embodied as or otherwise includes restoring platform settings to a default or "safe" setting. Additionally, in some embodiments, the recovery action may include displaying a list of recovery options to the user. The user may then select one or more of the recovery options.

Figure 2:
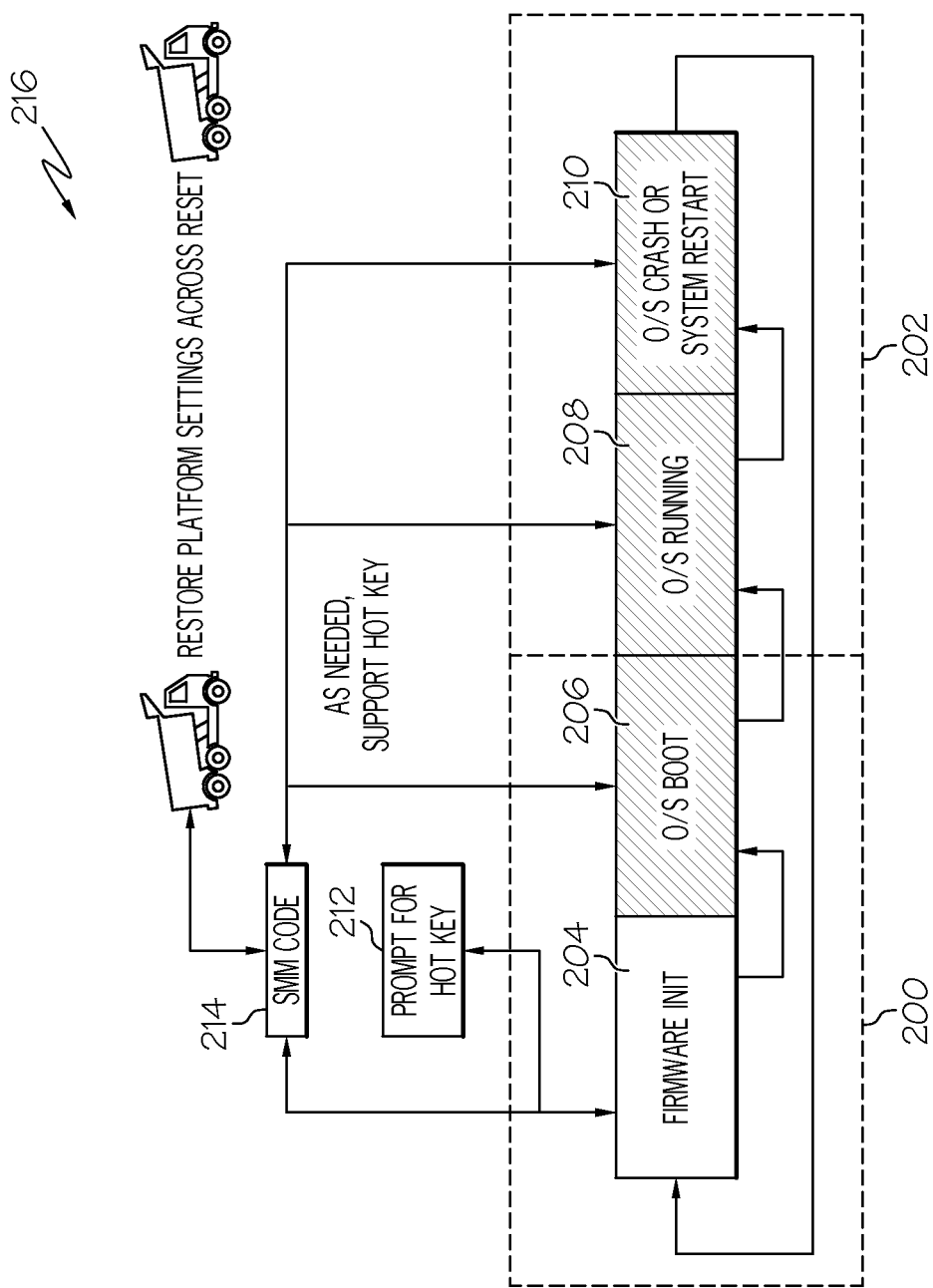
FIG. 2 is a simplified block diagram of system boot phases of a computing device supporting a hot key sequence recovery process.

The hot key sequence may be selected by the user during any operating phase of the computing device 100. For example, as illustrated in FIG. 2, during operation, the computing device 100 executes a pre-boot phase 200 and a runtime phase 202. The pre-boot phase 200 includes a firmware initialization phase 204 in which the platform firmware is initialized and an operating system boot phase 206 in which an operating system of the computing device 100 is initially booted or executed. Once the operating system is booted, the computing device 100 enters the runtime phase 202, which includes an operating system running phase 208. While the operating system is running, an error may sometimes occur that may "crash" the operating system or otherwise halt execution of the operating system causing the computing device to enter an error phase 210. During the error phase 210, the user may or may not be able to interact directly with the operating system.

During the firmware initialization phase 204, the user of the computing device 100 may be prompted for entry of the hot key sequence (see block 212). In response, the user may select the hot key sequence to cause the computing device 100 to perform the recovery action or actions. However, in addition, the user of the computing device 100 may select the hot key sequence at any time during the pre-boot phase 200 and/or the runtime phase 202 as needed. As such, the user may recover from an error of the computing device 100 during any phase of execution of the computing device 100. In response to the selection of the hot key sequence by the user, a system management interrupt (SMI) is generated. The system management interrupt is handled by the system management mode (SMM) 214 of the computing device 100, which may be embodied as one or more basic input/output system (BIOS) services of the computing device 100. In response to the system management interrupt, the system management mode may cause the computing device 100 to perform the one or more recovery actions 216, which may include restoration of the platform settings.

Figure 3:
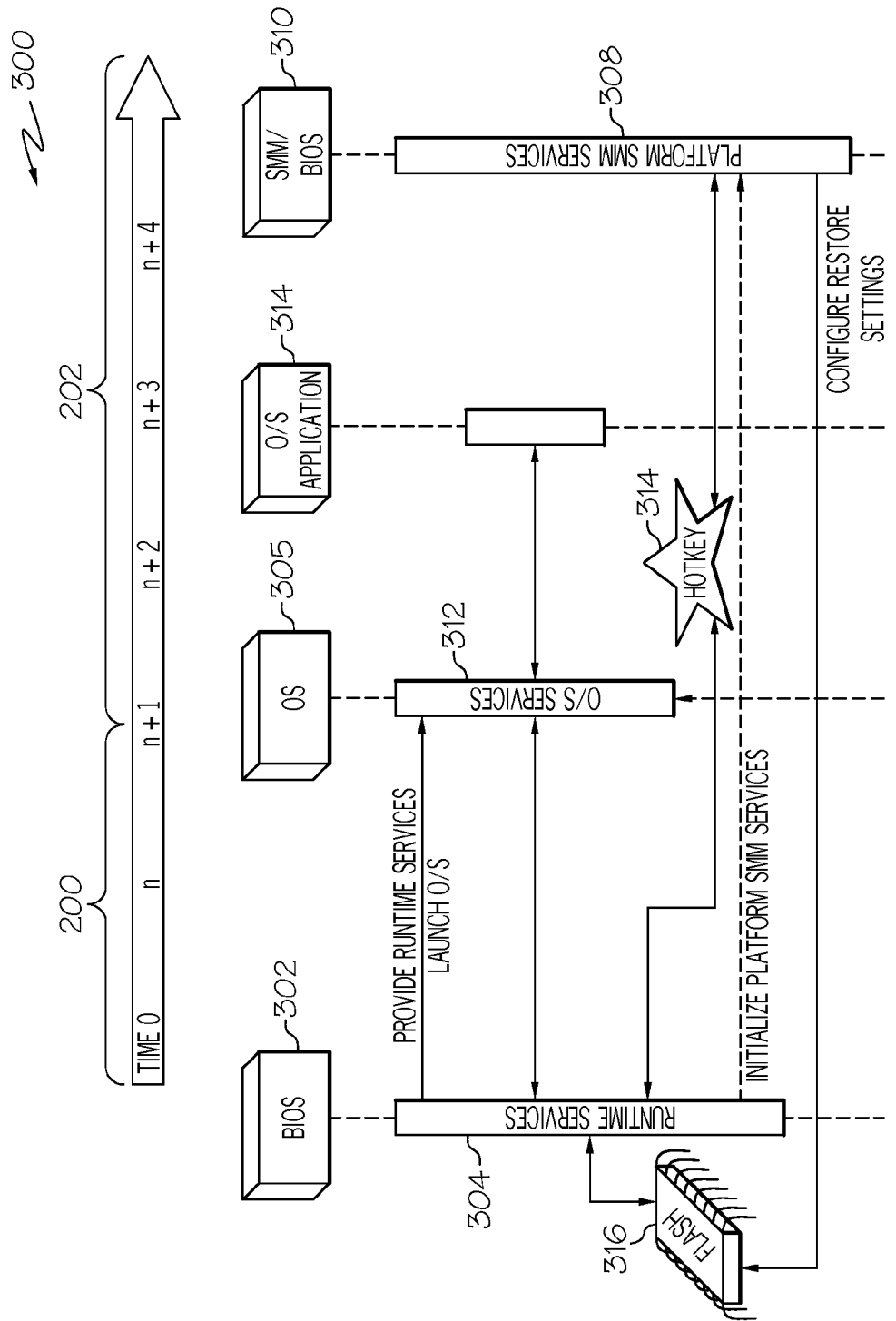
FIG. 3 is a simplified timeline of the system boot process of FIG. 2 wherein a hot key sequence recovery request has been received.

Referring now to FIG. 3, an illustrative execution timeline of the computing device 100 is illustrated. During the pre-boot phase 200, the basic input/output system 302 of the computing device 100 provides a number of runtime services 304 to launch an operating system 305. Additionally, the basic input/output system 302 initializes the platform system management mode services 308 of the system management mode 310. The operating system 305 includes a number of operating services 312, which may be used to launch one or more operating system applications 314. If the user selects a hot key sequence 314 during the execution of the operating system 305 (i.e., during the runtime phase 202), a system management interrupt is generated, which is handled by the system management mode services 308. In response, the system management mode services 308 causes the computing device 100 to perform one or more recovery actions. For example, as illustrated in FIG. 3, the system management mode services 308 may restore system settings from a memory device 316.

Figure 4:
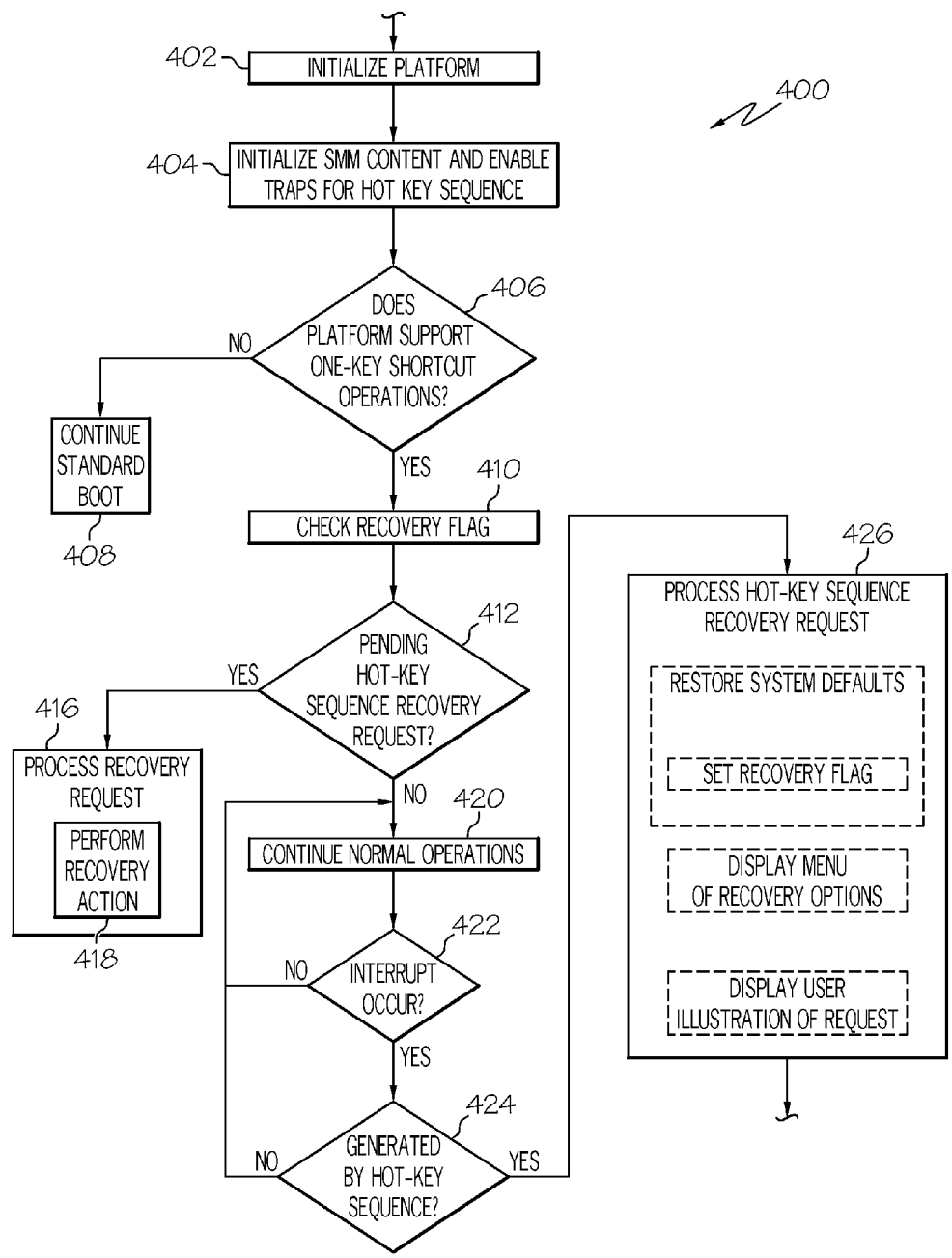
FIG. 4 is a simplified algorithm for recovery of a computing environment.

Referring now to FIG. 4, in one embodiment, an algorithm 400 for recovering computing device 100 from an error includes a block 402 in which the platform of the computing device 100 is initialized. For example, the memory 120 may be initialized in block 402. In block 404, the system management mode of the computing device 100 is initialized and a software trap for the hot key sequence is established. The software trap causes a system management interrupt to be generated in response to the user's selection of the hot key sequence. In the illustrative embodiment, the hot key sequence is embodied as a single key or keystroke, which is selectable by the user to cause the computing device 100 to perform a recovery action. However, as discussed above, the hot key sequence may be embodied as a plurality of keys or keystrokes in other embodiments.

In block 406, it is determined whether the platform of the computing device 100 supports one-key shortcut operations. If not, a standard boot process is executed in block 408. However, if the platform of the computing device 100 does support one-key shortcut operations, a recovery flag is checked in block 410. As discussed in more detail below, the recovery flag may be set to indicate that the computing device 100 should perform one or more recovery actions at start-up or otherwise during the booting process (e.g., during the pre-boot phase 200). The recovery flag may be embodied one or more bits of a software register, a value or other data that may be stored in a reserved memory location, or other software flag.

In block 412, the recovery flag is analyzed to determine whether a hot key sequence recovery request is pending. That is, it is determined whether the software flag is set in block 412. If so, the computing device 100 processes the recovery request in block 416. To do so, the computing device 100 may perform one or more recovery actions 418. As discussed above, the recovery action or actions may be embodied as any action performed by the computing device 100 to recovery from an error. For example, in some embodiments, the recovery action may be embodied as or otherwise include rebooting the computer device 100, restoring system defaults such as operating system defaults, restoring or re-creating one or more files, migrating memory, or other recovery actions. In one particular embodiment, the recovery action is embodied as or otherwise includes restoring platform settings to a default or "safe" setting. Additionally, in some embodiments, the recovery action may include displaying a list of recovery options to the user from which the user may select one or more of the recovery options.

If, however, there is no pending hot key sequence recovery request, the computing device 100 continues normal operations in block 420, which may include execution of an operating system and any number of software applications. During the normal operations of the computing device 100, the computing device 100 monitors for the generation of a system management interrupt in block 422. If a system management interrupt is generated, it is determined whether the system management interrupt was generated in response to the hot key sequence in block 424. That is, it is determined whether the user has selected the hot key sequence and, as such, requests recovery of the computing device 100.

If it is determined that the user has selected the hot key sequence in block 424, the computing device 100 process the hot sequence recovery request in block 426. To do so, the computing device 100 may perform one or more recovery actions. Again, as discussed above, the recovery action or actions may be embodied as any action performed by the computing device 100 to recovery from an error. For example, the recovery action may include restoring system defaults, which may include setting the recovery flag such that the defaults are restored during the next start-up or pre-boot phase of the computing device 100. Additionally, the recovery action may include displaying a menu of recovery options to the user from which the user may select one or more recovery actions. The recovery action may also include displaying an illustration or other indicia to the user to indicate that the user has requested a recovery action. Further, additional or alternative recovery actions may be performed by the computing device 100 in response to the user's selection of the hot key sequence as discussed above. As such, it should be appreciated that the user may select the hot key sequence to cause the computing device 100 to perform one or more recovery actions to recover the computing device 100 or computing environment thereof from an error such as, for example, a "crashed" state.

While the disclosure has been illustrated and described in detail in the drawings and foregoing description, such an illustration and description is to be considered as exemplary and not restrictive in character, it being understood that only illustrative embodiments have been shown and described and that all changes and modifications that come within the spirit of the disclosure are desired to be protected.

The invention claimed is:

1. A computing device comprising:
a keyboard having a plurality of keys;
a processor; and
a memory device having stored therein a plurality of instructions, which when executed by the processor, cause the computing device to:
monitor, during a pre-boot phase of the computing device, for entry of a reference hot key sequence on the keyboard by a user of the computing device;
monitor, during a runtime phase of the computing device, for entry of the reference hot key sequence on the keyboard by the user of the computing device; and
perform a recovery action in response to the user of the computing device entering the reference hot key sequence on the keyboard during one of the pre-boot phase and the runtime phase of the computing device, wherein to perform the recovery action comprises to perform the recovery action prior to performance of a non-recovery operation subsequent to entry of the reference hot key sequence on the keyboard, and
wherein the reference hot key sequence comprises at least a first key of the plurality of keys followed sequentially by a second key of the plurality of keys.

2. The computing device of claim 1, wherein the plurality of instructions further cause the computing device to:
monitor for entry of the first key during each of the pre-boot phase and the runtime phase; and
monitor for entry of the second key after the user having entered the first key.

3. The computing device of claim 1, wherein the plurality of instructions cause the computing device to initiate the recovery action while the computing device is experiencing an error.

4. The computing device of claim 1, wherein the computing device further comprises a display and the computing device performs the recovery action by displaying an illustration on the display to indicate that the user has entered the reference hot key sequence.

5. The computing device of claim 1, wherein the computing device performs the recovery action by restoring platform settings of the computing device to default values that were selected at the time of manufacture of the computing device as platform setting values that would return the computing device to a safe computing environment.

6. The computing device of claim 1, wherein the computing device performs the recovery action by setting a software flag to indicate that the reference hot key sequence has been entered.

7. The computing device of claim 6, wherein the software flag comprises a bit of a software register.

8. The computing device of claim 1, wherein the computing device further comprises a display, and the computing device performs the recovery action by displaying a menu of recovery options on the display, the recovery options being selectable by the user to cause the computing device to perform the selected recovery option.

9. The computing device of claim 1, wherein the plurality of instructions further cause the computing device to generate a system management interrupt in response to the user entering the reference hot key sequence during the runtime phase of the computing device, wherein the computing device performs the recovery action in response to the system management interrupt.

10. A method comprising:
monitoring, during a pre-boot phase of a computing device, for entry of a reference hot key sequence on a keyboard of the computing device;
monitoring, during a runtime phase, for entry of the reference hot key sequence on the keyboard of the computing device; and
performing a recovery action on the computing device in response to the reference hot key sequence being entered on the keyboard of the computing device during either the pre-boot phase or the runtime phase, wherein performing the recovery action comprises performing the recovery action prior to performance of a non-recovery operation subsequent to entry of the reference hot key sequence on the keyboard.

11. The method of claim 10, wherein the reference hot key sequence comprises a reference first key followed by a reference second key.

12. The method of claim 11, wherein monitoring for entry of the reference hot key sequence comprises:
monitoring for entry of the reference first key; and
monitoring for entry of the reference second key after the reference first key having been entered.

13. The method of claim 10, wherein performing the recovery action comprises initiating the recovery action while the computing device is experiencing an error.

14. The method of claim 10, wherein performing the recovery action comprises displaying an illustration on a display of the computing device to indicate that a user has entered the reference hot key sequence.

15. The method of claim 10, further comprising:
receiving default platform setting values that, when set on the computing device, cause the computing device to establish a safe computing environment, and
wherein performing the recovery action comprises restoring current platform settings of the computing device to the default platform setting values.

16. One or more non-transitory, machine readable media comprising a plurality of instructions stored thereon that, in response to being executed, result in a computing device:
monitoring, during a pre-boot phase of the computing device, for entry of a reference hot key sequence on a keyboard of the computing device;
monitoring, during a runtime phase of the computing device, for entry of the reference hot key sequence on the keyboard of the computing device; and
performing a recovery action on the computing device in response to the reference hot key sequence being entered on the keyboard during either the pre-boot phase or the runtime phase, wherein performing the recovery action comprises performing the recovery action prior to performance of a non-recovery operation subsequent to entry of the reference hot key sequence on the keyboard, and
wherein the reference hot key sequence comprises a reference first key followed sequentially by a reference second key.

17. The one or more non-transitory, machine readable media of claim 16, wherein monitoring for entry of the reference hot key sequence comprises:
monitoring for entry of the reference first key; and
monitoring for entry of the reference second key after the reference first key having been entered.

18. A computing device comprising:
a keyboard having a plurality of keys;
a processor; and
a memory device having stored therein a plurality of instructions, which when executed by the processor, cause the computing device to:
monitor, during a pre-boot phase of the computing device, for entry of a reference hot key sequence on the keyboard by a user of the computing device;
monitor, during a runtime phase of the computing device, for entry of the reference hot key sequence on the keyboard by the user of the computing device; and
perform a recovery action in response to the user of the computing device entering the reference hot key sequence on the keyboard during one of the pre-boot phase and the runtime phase of the computing device, wherein to perform the recovery action comprises to perform the recovery action prior to performance of a non-recovery operation subsequent to entry of the reference hot key sequence on the keyboard.

19. The computing device of claim 18, wherein the computing device performs the recovery action by restoring platform settings of the computing device to default values that were selected at the time of manufacture of the computing device as platform setting values that would return the computing device to a safe computing environment.

20. The computing device of claim 18, wherein the plurality of instructions further cause the computing device to generate a system management interrupt in response to the user entering the reference hot key sequence during the runtime phase of the computing device, wherein the computing device performs the recovery action in response to the system management interrupt.

* * * * *